United States Patent
Kumar et al.

(10) Patent No.: US 10,551,477 B2
(45) Date of Patent: Feb. 4, 2020

(54) METHOD AND APPARATUS FOR V2X ASSISTED POSITIONING DETERMINATION USING POSITIONING REFERENCE SIGNAL SIGNALS

(71) Applicant: QUALCOMM Incorporated, San Diego, CA (US)

(72) Inventors: Akash Kumar, Hyderabad (IN); Sai Pradeep Venkatraman, Santa Clara, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/938,911

(22) Filed: Mar. 28, 2018

(65) Prior Publication Data

US 2019/0302220 A1     Oct. 3, 2019

(51) Int. Cl.
| | |
|---|---|
| *G01S 5/02* | (2010.01) |
| *G01S 5/00* | (2006.01) |
| *H04W 4/44* | (2018.01) |
| *H04W 4/46* | (2018.01) |

(52) U.S. Cl.
CPC .......... *G01S 5/0236* (2013.01); *G01S 5/0063* (2013.01); *H04W 4/44* (2018.02); *H04W 4/46* (2018.02)

(58) Field of Classification Search
CPC ...... G01S 5/0236; G01S 5/0063; H04W 4/46; H04W 4/44
See application file for complete search history.

(56) References Cited

U.S. PATENT DOCUMENTS

| | | | |
|---|---|---|---|
| 8,559,537 B2 | 10/2013 | Fernandez et al. | |
| 2002/0014978 A1* | 2/2002 | Flick | B60R 25/04 |
| | | | 340/988 |
| 2002/0077080 A1* | 6/2002 | Greene | H04W 8/14 |
| | | | 455/412.1 |

(Continued)

FOREIGN PATENT DOCUMENTS

WO      2017136627 A1     8/2017

OTHER PUBLICATIONS

Hoang G.M., et al.,"Mitigating Unbalanced GDoP Effects in Range-Based Vehicular Cooperative Localization", IEEE International Conference on Communications Workshops (ICC Workshops), 2017, 6 Pages.

(Continued)

*Primary Examiner* — Minjung Kim
(74) *Attorney, Agent, or Firm* — Thien T. Nguyen

(57) ABSTRACT

A user equipment (UE) may receive Vehicle-to-Everything (V2X) information from a V2X entity, such as a vehicle, road side unit, or other UE carried by a pedestrian. The V2X information may be transmitted to a location server by the UE to obtain positioning assistance data. The location server may determine a coarse position of the UE using the V2X information and generate corresponding positioning assistance data including Positioning Reference Signal (PRS) information for neighbor base stations, which is transmitted to the UE. The UE may detect PRS signals from the neighbor base stations and perform position determination using the PRS signals. The V2X entity or a different V2X entity may also transmit PRS signals that are received by the UE and used along with the PRS signal from the neighbor base stations to perform position determination.

17 Claims, 9 Drawing Sheets

(56) References Cited

U.S. PATENT DOCUMENTS

| | | | | |
|---|---|---|---|---|
| 2012/0015667 | A1* | 1/2012 | Woo | G01S 5/0221 |
| | | | | 455/456.1 |
| 2014/0221005 | A1 | 8/2014 | Marshall et al. | |
| 2016/0061614 | A1* | 3/2016 | Lee | G01S 19/07 |
| | | | | 701/446 |
| 2016/0249315 | A1 | 8/2016 | Venkatraman et al. | |
| 2017/0041899 | A1* | 2/2017 | Venkatraman | H04W 64/00 |
| 2017/0061790 | A1 | 3/2017 | Jana et al. | |
| 2017/0075355 | A1* | 3/2017 | Micks | G05D 1/0257 |
| 2017/0215203 | A1 | 7/2017 | Lee et al. | |
| 2017/0374638 | A1* | 12/2017 | Han | H04J 11/00 |
| 2018/0077670 | A1 | 3/2018 | Jain et al. | |
| 2018/0247537 | A1* | 8/2018 | Oh | G08G 1/161 |

OTHER PUBLICATIONS

"3rd Generation Partnership Project; Technical Specification Group Services and System Aspects; Architecture enhancements for V2X services (Release 14)", 3GPP Standard; Technical Specification; 3GPP TS 23.285, 3rd Generation Partnership Project (3GPP), Mobile Competence Centre, 650, Route Des Lucioles; F-06921 Sophia-Antipolis Cedex, France, vol. SA WG2, No. V14.2.0, Mar. 13, 2017 (Mar. 13, 2017), pp. 1-35, XP051290439, [retrieved on Mar. 13, 2017].

International Search Report and Written Opinion—PCT/US2019/024401—ISA/EPO—dated Jul. 18, 2019.

* cited by examiner

METHOD AND APPARATUS FOR V2X ASSISTED POSITIONING DETERMINATION USING POSITIONING REFERENCE SIGNAL SIGNALS

BACKGROUND

Background Field

The subject matter disclosed herein relates to wireless communications systems, and more particularly to methods and apparatuses for location determination of a user equipment in a wireless communications system.

Relevant Background

Obtaining accurate position information for user equipment, such as cellular telephones or other wireless communication devices, is becoming prevalent in the communications industry. A common means to determine the location of a device is to use a satellite positioning system (SPS), such as the well-known Global Positioning Satellite (GPS) system or Global Navigation Satellite System (GNSS), which employ a number of satellites that are in orbit around the Earth.

Location determination using an SPS is accurate, but sometimes is not available or desired, e.g., for indoors or areas with poor satellite signal reception. Other means commonly used to determine the location of a device includes terrestrial based positioning. During terrestrial based positioning, measurements of signals from nearby transmitters, such as cellular base stations (towers) may be made and used to determine a position of the user equipment.

SUMMARY

A user equipment (UE) may receive Vehicle-to-Everything (V2X) information from a V2X entity, such as a vehicle, road side unit, or other UE carried by a pedestrian. The V2X information may be transmitted to a location server by the UE to obtain positioning assistance data. The location server may determine a coarse position of the UE using the V2X information and generate corresponding positioning assistance data including Positioning Reference Signal (PRS) information for neighbor base stations, which is transmitted to the UE. The UE may detect PRS signals from the neighbor base stations and perform position determination using the PRS signals. The V2X entity or a different V2X entity may also transmit PRS signals that are received by the UE and used along with the PRS signal from the neighbor base stations to perform position determination.

In one implementation, a method of performing location determination by a user equipment (UE) includes receiving Vehicle-to-Everything (V2X) information from an entity in a wireless network that provides V2X services, the V2X services comprising services for at least one of Vehicle-to-Vehicle (V2V), Vehicle-to-Pedestrian (V2P), Vehicle-to-Infrastructure (V2I), Vehicle-to-Network (V2N) or a combination thereof, wherein the V2X information comprises information from which an approximate location of the UE may be determined; transmitting the V2X information to a location server to obtain positioning assistance data from the location server; receiving positioning assistance data from the location server in response to the V2X information, the positioning assistance data comprising position information, identification, and Positioning Reference Signal (PRS) information for neighbor base stations; receiving PRS signals from the neighbor base stations; and performing position determination for the UE using the PRS signals.

In one implementation, a user equipment (UE) that performs location determination includes a wireless transceiver configured to wirelessly communicate with entities in a first wireless network that provides V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof and configured to wirelessly communicate with base stations in a second wireless network; and at least one processor coupled to the wireless transceiver and configured to receive with the wireless transceiver Vehicle-to-Everything (V2X) information from an entity in the wireless network that provides V2X services, wherein the V2X information comprises information from which an approximate location of the UE may be determined, transmit with the wireless transceiver the V2X information to a location server to obtain positioning assistance data from the location server, receive with the wireless transceiver positioning assistance data from the location server in response to the V2X information, the positioning assistance data comprising position information, identification, and Positioning Reference Signal (PRS) information for neighbor base stations, receive PRS signals from the neighbor base stations with the wireless transceiver, and perform position determination for the UE using the PRS signals.

In one implementation, a method of performing location determination for a user equipment (UE) includes receiving Vehicle-to-Everything (V2X) information from the UE to obtain positioning assistance data, the V2X information is for an entity in a wireless network that provides V2X services to the UE, the V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X information comprises information from which an approximate location of the UE may be determined; determining a coarse position of the UE using the V2X information; generating the positioning assistance data using the coarse position of the UE; and transmitting the positioning assistance data to the UE, the positioning assistance data comprising position information, identification, and Positioning Reference Signal (PRS) information for neighbor base stations.

In one implementation, a location server for location determination for a user equipment (UE) includes an external interface configured to wirelessly communicate with the UE in a wireless network; and at least one processor coupled to the external interface and configured to receive with the external interface Vehicle-to-Everything (V2X) information from the UE to obtain positioning assistance data, the V2X information is for an entity in a wireless network that provides V2X services to the UE, the V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X information comprises information from which an approximate location of the UE may be determined, determine a coarse position of the UE using the V2X information, generate the positioning assistance data using the coarse position of the UE, and transmit with the external interface the positioning assistance data to the UE, the positioning assistance data comprising position information, identification, and Positioning Reference Signal (PRS) information for neighbor base stations.

In one implementation, a method of performing location determination of a user equipment (UE) includes transmitting to a UE Vehicle-to-Everything (V2X) information from an entity in a wireless network that provides V2X services to the UE, the V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X information comprises information from which an approximate location of the UE may be determined; and transmitting a Positioning Reference Signal (PRS) from the entity to the UE for position determination for the UE using the PRS signals.

In one implementation, a Vehicle-to-Everything (V2X) entity for providing V2X services to a user equipment (UE), the V2X entity includes a wireless transceiver configured to wirelessly communicate with the UE in a wireless network to provide V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof; and at least one processor coupled to the wireless transceiver and configured to transmit with the wireless transceiver V2X information comprising information from which an approximate location of the UE may be determined, and transmit with the wireless transceiver a Positioning Reference Signal (PRS) to the UE for position determination for the UE using the PRS signals.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

The Vehicle-to-Everything (V2X) communication standard is being developed in order to achieve and provide a high degree of safety for pedestrians, moving vehicles, etc. V2X is a communication system in which information is passed between a vehicle and other entities within the wireless communication network that provides the V2X services. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop Advanced Driver Assistance System (ADAS), which helps drivers with critical decisions, such as lane changes, speed changes, overtaking speeds, etc. Low latency communications are used in V2X and, are therefore suitable for precise positioning. For example, current positioning techniques, such as time of arrival (TOA), time difference of arrival (TDOA) or observed time difference of arrival (OTDOA), or any other cellular positioning technique, may be enhanced using assistance from V2X.

In general, there are two modes of operation for V2X services, as defined in Third Generation Partnership Project (3GPP) TS 23.285. One mode of operation uses direct wireless communications between V2X entities when the V2X entities are within range of each other. The other mode of operation uses network based wireless communication between entities. The two modes of operation may be combined or other modes of operation may be used if desired.

Figure 1:
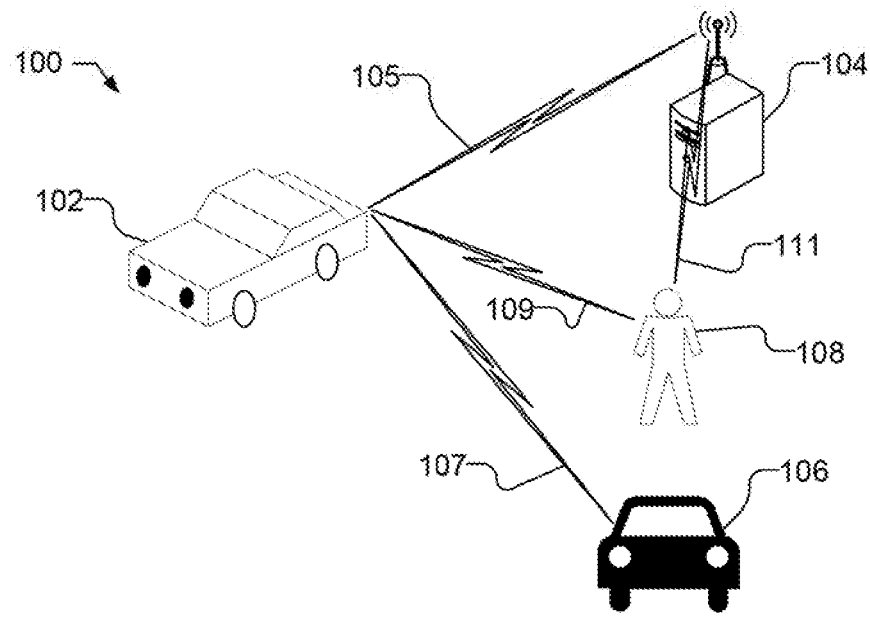
FIG. 1 illustrates a Vehicle-to-Everything (V2X) wireless communication system in which V2X services operate using direct wireless communications between the V2X entities.

FIG. 1 illustrates a V2X wireless communication system 100 in which V2X services operate using direct wireless communications between the V2X entities. The wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. As illustrated, a vehicle 102 may directly communicate with various other entities within the wireless network, including a road side unit (RSU) 104 in a Vehicle-to-Infrastructure (V2I) communication link 105, another vehicle 105 in a Vehicle-to-Vehicle (V2V) communication link 107, and a pedestrian 108 (or, more accurately, a UE that is with the pedestrian 108) in a Vehicle-to-Pedestrian (V2P) communication link 109. A road side unit (RSU) is a stationary infrastructure entity supporting V2X applications that can exchange messages with other entities supporting V2X applications. An RSU may be a logical entity that may combine V2X application logic with the functionality of an eNB (referred to as eNB-type RSU) or UE (referred to as UE-type RSU). As illustrated, the pedestrian 108 may also wirelessly communicate with the RSU 104 via a communication link 111. During direct communications with one or more entities in the V2X wireless communication system 100, each entity provides V2X information, such as an identifier for the V2X entity, as well as other information in messages such as Common Awareness Messages (CAM) and Decentralized Notification Messages (DENM) or Basic Safety Message (BSM), which may be used for, e.g., Advanced Driver Assistance System (ADAS) or safety use cases, such as lane changes, speed changes, overtaking speeds, etc.

Figure 2:
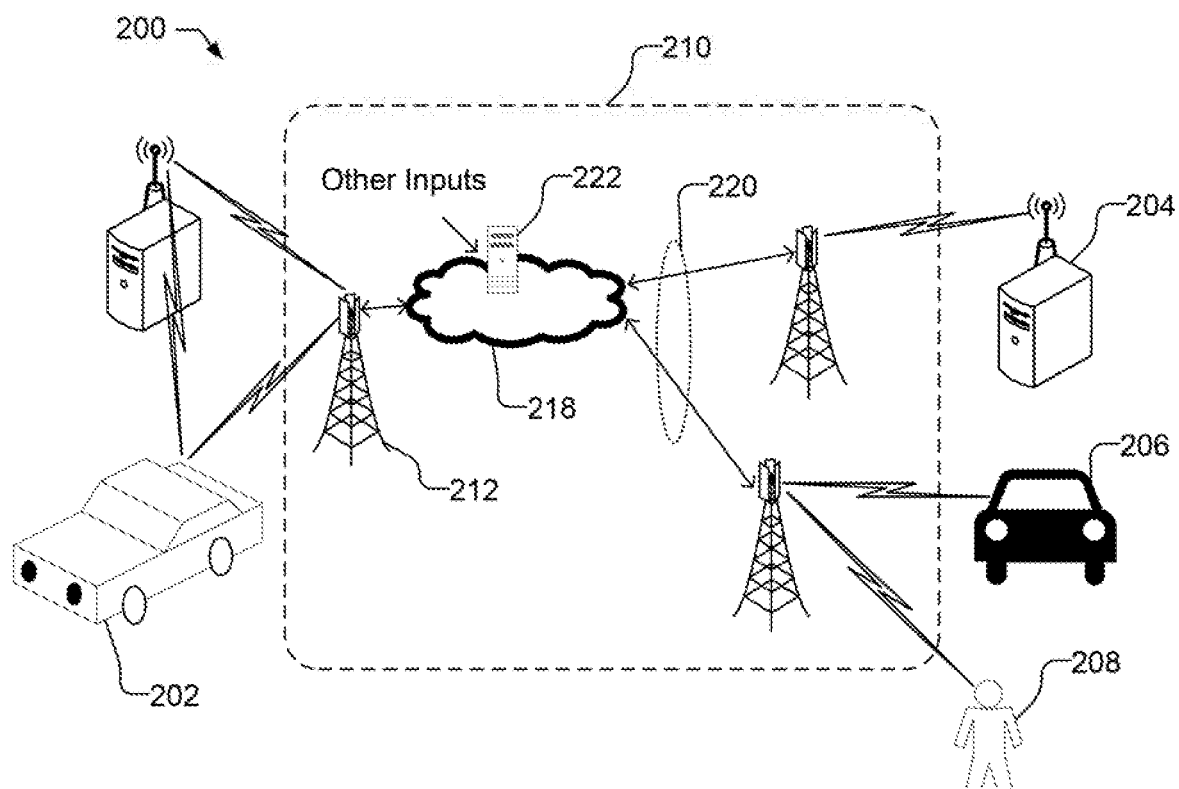
FIG. 2 illustrates a Vehicle-to-Network (V2N) wireless communication system in which V2X services operate using a network between entities.

FIG. 2 illustrates a Vehicle-to-Network (V2N) wireless communication system 200 in which V2X services operate using a wireless network between entities, such as Wireless Wide Area Networks (WWAN). For example, entities may communicate via the Long Term Evolution (LTE) network, where the radio interface between the user equipment (UE) and the eNodeB is referred to as LTE-Uu, or other appropriate wireless networks, such as "3G," "4G," or "5G" networks. As illustrated, a vehicle 202 may wirelessly communicate with various other V2X entities, such as RSU 204, another vehicle 206 or a pedestrian 208, through the network infrastructure 210, which for the sake of example, will be referred to as a LTE network. The vehicle 202, for example, may wirelessly communicate with a base station 212, referred to as an eNodeB in the LTE network infrastructure 210, via a Uu interface 203. As illustrated, in some implementations, the vehicle 202 may directly communicate with an RSU 204A, which interfaces with the base station 212. The base station 212 communicates with other base stations (e.g., eNodeBs) 214, 216 through the IP layer 218 and network 220, such as an Evolved Multimedia Broadcast Multicast Services (eMBMS)/Single Cell Point To Multipoint (SC-PTM) network. A V2X application server 222 may be part of or connected to the IP layer 218 and may receive and route information between the V2X entities as well as receive other external inputs. The base stations 214 and 216 may wirelessly communicate with the other V2X entities, such as RSU 204, vehicle 206, and pedestrian 208 via Uu interfaces 205, 207, and 209 respectively. The V2N communication using the "Uu" interface provide driving relevant information over a greater distance than the direct communications shown in FIG. 1, which may be useful, e.g., to provide real-time traffic and rowing services.

The V2X communications based on direct wireless communications between the V2X entities, such as that illustrated in FIG. 1, do not require any network infrastructure for the V2X entities to communicate and enable low latency communications, which is advantageous for precise positioning. Accordingly, such direct wireless V2X communications may be used to enhance the performance of current positioning techniques, such as TOA, TDOA or OTDOA.

Figure 3:
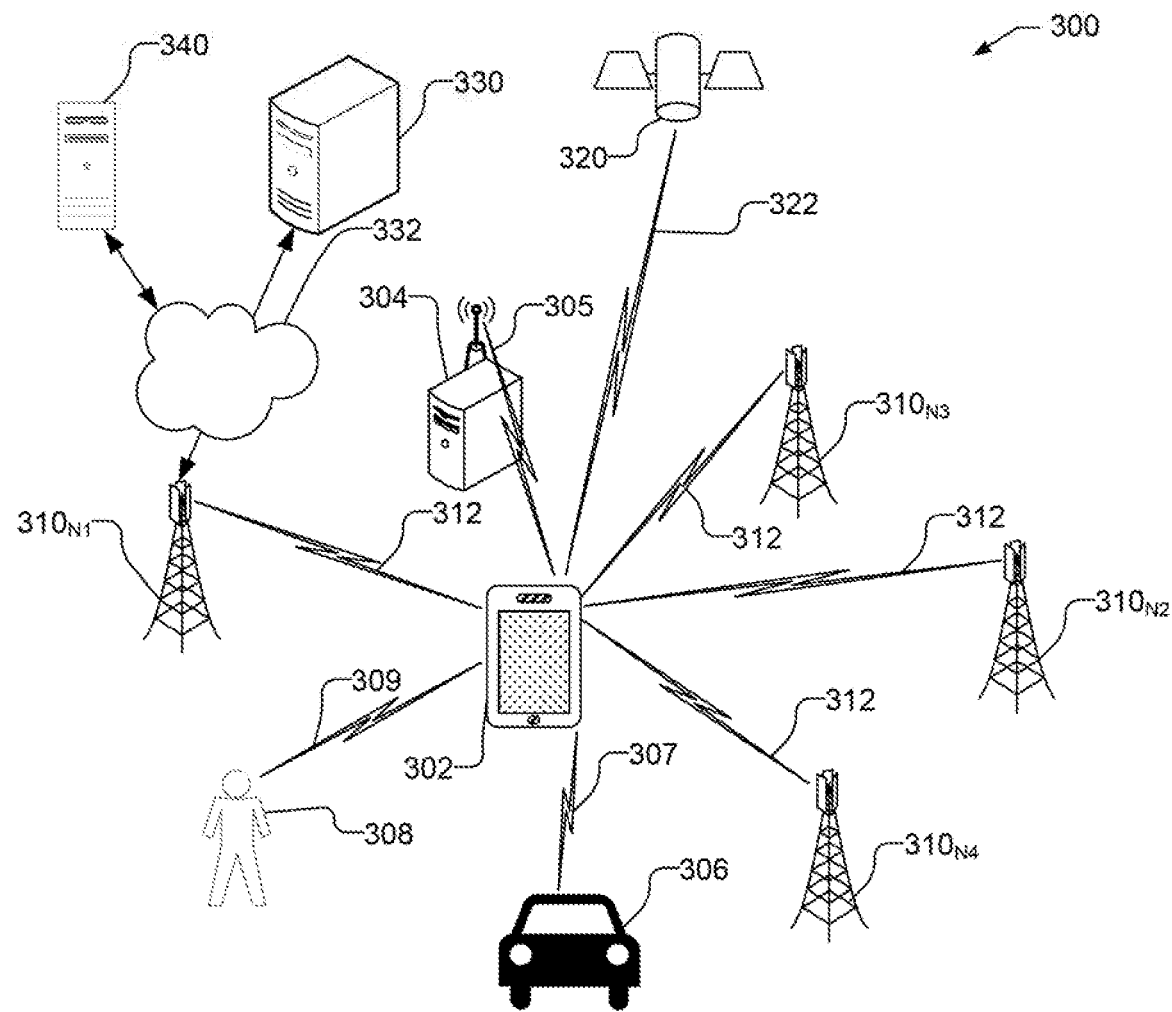
FIG. 3 is a simplified diagram illustrating a wireless communication system that may be used for position determination of the user equipment.

FIG. 3 is a simplified diagram illustrating a wireless communication system 300 that may be used for position determination of the user equipment (UE) 302. As illustrated, the UE 302 is capable of direct wireless communications with V2X entities, such as RSU 304, vehicle 306, and pedestrian 308, via communication links 305, 307, and 309, respectively. The UE 302 may also be capable of wireless communications with a number of base stations $310_{N1}$, $310_{N2}$, $310_{N3}$, and $310_{N4}$ (sometimes collectively referred to as base stations 310), as illustrated by links 312, which may be part of a cellular communication network.

The UE 302 may receive positioning reference signals (PRS) from the base stations 310 which may be used for location determination of the UE 302, e.g., time of arrival (TOA), time difference of arrival (TDOA) or observed time difference of arrival (OTDOA) positioning solutions. Additionally, the UE 302 may receive V2X information from one or more of the V2X entities 304, 306, 308, which may be used to assist in a coarse position determination of the UE 302 from which appropriate positioning assistance data may be generated. For example, the UE 302 may receive the identity of one or more of the V2X entities, such as RSU 304. The identity of the V2X entity may be used to determine the location of the V2X entity, which may be used as the coarse position of the UE 302 from which appropriate assistance data may be generated and provided to the UE 302. In another implementation, the UE 302 may receive the identity and an associated location of one or more of the V2X entities, which may be used as the coarse position of the UE 302 from which appropriate assistance data may be generated and provided to the UE 302. Additionally, the UE 302 may receive PRS signals from one or more V2X entities, which may be used, e.g., along with the PRS signals from the base stations 310, for location determination of the UE 302, e.g., such as TOA, TDOA, or OTDOA positioning solutions.

As illustrated in FIG. 3, the UE 302 additional may be capable of receiving signals 322 from a Satellite Positioning System (SPS) satellite 320 with which location determination of the UE 302 may be performed. Typically, SPS positioning uses signals from four or more SPS satellites 320, which may be belong to a Global Navigation Satellite System (GNSS) including Global Positioning System (GPS), Galileo, GLONASS or COMPASS or a non-global system, such as QZSS.

The UE 302 may communicate with a separate location server 330 through, e.g., base station 310 and network 332, in order to obtain positioning assistance data. For example, the UE 302 may communicate with the location server 330 to provide information with which an approximate position of the UE 302 may be determined by the location server 330. In response, the location server 330 may generate and provide assistance data for the UE 302, including, e.g., the identities, locations, and signaling information for neighbor base stations 310, i.e., base stations from which the UE 302 may be able to receive PRS signals.

Conventionally, the location server 330 may only receive the identity of the serving base station $310_{N1}$, i.e., the base station with which the UE 302 is communicating. Base stations 310, however, may have a range of, e.g., approximately 100 km, and accordingly, a course position of the UE 302 based merely on a known location of an identified serving base station will have a large uncertainty.

In the wireless communication system 300, however, the UE 302 is in direct communication with V2X entities 304, 306, and 308. The direction communication between the V2X entities has a much short range than base stations 310, e.g., approximately 100 m, and consequently, a course position of the UE 302 based on a known location of an identified V2X entity will have much greater accuracy and less uncertainty. Accordingly, the UE 302 may provide to the location server 330 the V2X information that is obtained from one or more of the V2X entities 304, 306, and 308 instead of or in addition to the identity of the serving base station. The V2X information, for example, may be an identifier of the V2X entity, e.g., an International Mobile station Equipment Identities (IMEI), with which the UE 302 is in direct communication, or may be an identifier and associated location of the V2X entity. The location server 330 may contact a V2X Application server 340 using the V2X information, such as the identity of the V2X entities, and obtain the associated locations of the V2X entities from the V2X Application server 340. In implementations where the V2X entities provide V2X information that include their current locations, the UE 302 may provide the location of the V2X entities to the location server 304 and there is no need for the location server 304 to contact the V2X Application server 340 for this information. Some of the V2X entities, such as the RSU 304 may have a static location, which may be particularly useful. Other V2X entities, such as vehicle 306 or pedestrian, may be moving, but the V2X Application server 340 may provide a current location for these entities if known, which may also be useful to the location server 330 to estimate a coarse position of the UE 302 due to the short range of the direction communication between the V2X entities.

Using the location of the nearby V2X entities, the location server 330 may estimate a coarse position for the UE 302 that is more accurate than if only the location of the serving base station 310 were used as the coarse position of the UE 302. The location server 330 may select neighbor base stations 310 around the coarse position of the UE 302 so that good measurement geometry may be obtained. The relative geometry between the UE and base stations used to determine the location of the UE affects the accuracy of final location determination and is measured with Geometrical Dilution of Precision (GDOP). With the use of the location of the nearby V2X entities to select neighbor base stations, the location server 330 may identify neighbor base stations and their PRS configurations in the assistance data to the UE 302 that will have better GDOP, and hence better final position accuracy then if only the location of the serving base station is used.

Moreover, the location server 330 may use the location of a nearby V2X entity, such as the RSU 304, to predict the RSTD value that the UE 302 is expected to measure as well as the RSTD uncertainty. The expected RSTD and the expected RSTD uncertainty provided in assistance data by the location server 330 is based on a rough apriori location of the UE 302 that is conventionally determined from, e.g., Cell-ID or Enhanced Cell-ID positioning. With a coarse position of the UE 302, the location server 330 may select neighbor base stations for RSTD measurements and using the coarse position and the known locations of each neighbor base station, the location server 330 may calculate an expected RSTD value (and uncertainty) associated with each neighbor base station. By using the location of a nearby V2X entity, as opposed to the less accurate location of a serving base station, to determine the coarse position of the UE 302, the predicted RSTD value measured from various neighboring base stations will have increased accuracy with less uncertainty. Accordingly, the location server 330 may provide a significantly reduced PRS search window to the UE 302 in the assistance data compared to a conventional system that is based on the location of the serving base station. The PRS search sensitivity of the UE 302 will therefore be improved, which will improve the battery performance of the UE 302.

Thus, based at least in part on the V2X information provided to the location server 330 by the UE 302, the location server 330 may provide positioning assistance data to the UE 302. Because the PRS configuration is specific to each transceiver, i.e., base station and or V2X entity (if used), the assistance data, e.g., OTDOA assistance data, provided by the location server includes the PRS configuration for each transceiver and when the to-be-measured PRS signals are expected to arrive at the UE. Because the location server 330 uses the V2X information to generate the assistance data, as opposed to the conventional use of the serving base station, the assistance data includes identities and PRS configurations of the reference and neighbor base stations having improved GDOP and a more accurate PRS search window.

By way of example, in OTDOA assistance data, the PRS configuration for a reference base station, typically the serving base station, provided by the location 330 may include an identifier for the base station, such as the Physical Cell ID (PCI), and may include other identifiers, such as a Cell Global ID, as well as a Channel Number such as the EUTRA Absolute Radio Frequency Channel Number (EARFCN), an Antenna Port Configuration, the Cyclic Prefix (CP) length, and PRS information, which defines the PRS configuration of the cell, if the PRS is configured on the reference cell. The PRS configuration for the neighbor base stations provided in OTDOA assistance data from the location server 330 may include identifiers for the base stations, such as the Physical Cell ID (PCI) as well as the expected RSTD and the expected RSTD uncertainty. Additionally, the PRS configuration for the neighbor base stations may include other identifiers, such as a Cell Global ID, as well as a Channel Number such as the EUTRA Absolute Radio Frequency Channel Number (EARFCN), an Antenna Port Configuration, the Cyclic Prefix (CP) length, PRS information, which defines the PRS configuration of the cell, if the PRS is configured on the reference cell, a Slot Number offset, and PRS Subframe Offset. The PRS information provided in the OTDOA assistance data allows the UE 302 to determine the PRS configuration and the PRS schedule for the reference base station and neighbor base stations. The PRS information for example, includes, e.g., the PRS bandwidth, a PRS Configuration Index, the number of PRS DL frames, and may include muting information if muting is used.

The UE 302 may use the assistance data to detect and receive the PRS signals from the neighbor base stations. Additionally, in some implementations, one or more V2X entities, and in particular, V2I entities such as the RSU 304, may transmit PRS signals. The identity and PRS configuration of any PRS transmitting V2X entity may be provided in the assistance data by the location server 330 and the UE 302 may use the assistance data to receive the PRS signals from one or more V2X entities.

With the location related measurements, e.g., the PRS signals from the neighbor base stations 310 and one or more V2X entities (if used), the UE 302 (or the location server 330) may determine a location estimate for UE 302 using any one of several position methods such as, for example, GNSS, Assisted GNSS (A-GNSS), Advanced Forward Link Trilateration (AFLT), Observed Time Difference Of Arrival (OTDOA) or Enhanced Cell ID (E-CID) or combinations thereof. In some of these techniques (e.g. A-GNSS, AFLT and OTDOA), pseudoranges, time of arrival, or timing differences may be measured at UE 302 relative to three or more terrestrial transmitters or relative to four or more satellites with accurately known orbital data, or combinations thereof, based at least in part, on pilots, positioning reference signals (PRS) or other positioning related signals transmitted by the transmitters or satellites and received at UE 302. For example, the PRS signals may be used to determine a time of arrival (TOA) of signals from neighbor base stations 310 and one or more V2X entities (if used), which may be used to provide a distance between the UE 302 and the transmitting entity. In the case of OTDOA, UE 302 may measure a Reference Signal Time Difference (RSTD) between signals such as PRS signals transmitted by neighbor base stations 310 and one or more V2X entities (if used). An RSTD measurement may provide the time of arrival difference between signals (e.g. PRS) received at UE 302 from two different transceivers, e.g., between signals received from a reference base station $310_{N1}$ (typically the serving base station) and neighbor base station $310_{N2}$ or RSU 304. In some implementations of OTDOA, the signals used for RSTD measurements (e.g. PRS signals) may be accurately synchronized by the transceivers to a common universal time such as GPS time or Coordinated Universal Time (UTC), e.g., using a SPS receiver at each transceiver to accurately obtain the common universal time. The UE 302 (or location server 330) may use the location related measurements along with the known locations of the base stations and one or more V2X entities (if used) to compute an estimated location for UE 302.

It should be understood that OTDOA is a positioning method used with Universal Terrestrial Radio Access Network (UTRAN) or Evolved UMTS (Universal Mobile Telecommunications System) Terrestrial Radio Access Network (E-UTRAN), in which a mobile stations is referred to as user equipment and a base station is referred to as an eNodeB, and the location server is referred to as an enhanced serving mobile location center (E-SMLC). The disclosure herein, however, is not limited to UTRAN or E-UTRAN, but may be used with comparable location related measurements performed by the UE 302 in other radio access networks.

Moreover, the UE 302 may be any electronic device capable of wireless communications and receiving PRS signals and signals from V2X entities. The UE 302 may be referred to as a device, a wireless device, a mobile terminal, a terminal, a mobile station (MS), a mobile device, a SUPL Enabled Terminal (SET) or by some other name and may correspond to (or be part of) a vehicle, smart watch, digital glasses, and fitness monitor, smart cars, smart appliances, cellphone, smartphone, laptop, tablet, PDA, tracking device, control device, or some other portable or moveable device. A UE 302 may comprise a single entity or may comprise multiple entities such as in a personal area network where a user may employ audio, video and/or data I/O devices and/or body sensors and a separate wireline or wireless modem. Typically, though not necessarily, a UE 302 may support wireless communication such as using GSM, Code Division Multiple Access (CDMA), Wideband CDMA (WCDMA), LTE, High Rate Packet Data (HRPD), IEEE 802.11 WiFi, Bluetooth® (BT), WiMax, etc. A UE 302 may also support wireless communication using a wireless LAN (WLAN), Digital Subscriber Line (DSL) or packet cable for example. Although FIG. 3 shows only one UE 302, there may be many other UEs that can each correspond to UE 302.

The UE 302 may enter a connected state with a wireless communication network that may include the network 332. In one example, UE 302 may communicate with a cellular communication network by transmitting wireless signals to, or receiving wireless signals from a cellular transceiver, such as base station $310_{N1}$. The network 332 may include one or more additional base stations. The base station $310_{N1}$ provides user and control planes protocol terminations toward the UE 302. The base stations 310 may also be referred to as an evolved Node B, a base transceiver station, a radio base station, a radio transceiver, a radio network controller, a transceiver function, a base station subsystem (BSS), an extended service set (ESS), some other suitable terminology. The UE 302 also may transmit wireless signals to, or receive wireless signals from a local transceiver, such as an access points (AP), femtocell, Home Base Station, small cell base station, Home Node B (HNB) or Home eNodeB (HeNB) and may provide access to a wireless local area network (WLAN, e.g., IEEE 802.11 network), a wireless personal area network (WPAN, e.g., Bluetooth network) or a cellular network (e.g. an LTE network or other wireless wide area network such as those discussed in the next paragraph). Of course it should be understood that these are merely examples of networks that may communicate with a mobile device over a wireless link, and claimed subject matter is not limited in this respect.

Examples of network technologies that may support wireless communication including Global System for Mobile Communications (GSM), Code Division Multiple Access (CDMA), Wideband CDMA (WCDMA), Long Term Evolution (LTE), High Rate Packet Data (HRPD). GSM, WCDMA and LTE are technologies defined by 3GPP. CDMA and HRPD are technologies defined by the 3rd Generation Partnership Project 2 (3GPP2). WCDMA is also part of the Universal Mobile Telecommunications System (UMTS) and may be supported by an HNB. Cellular transceivers, such as base stations 310 may comprise deployments of equipment providing subscriber access to a wireless telecommunication network for a service (e.g., under a service contract). Here, a cellular transceiver may perform functions of a cellular base station in servicing subscriber devices within a cell determined based, at least in part, on a range at which the cellular transceiver is capable of providing access service.

Figure 4:
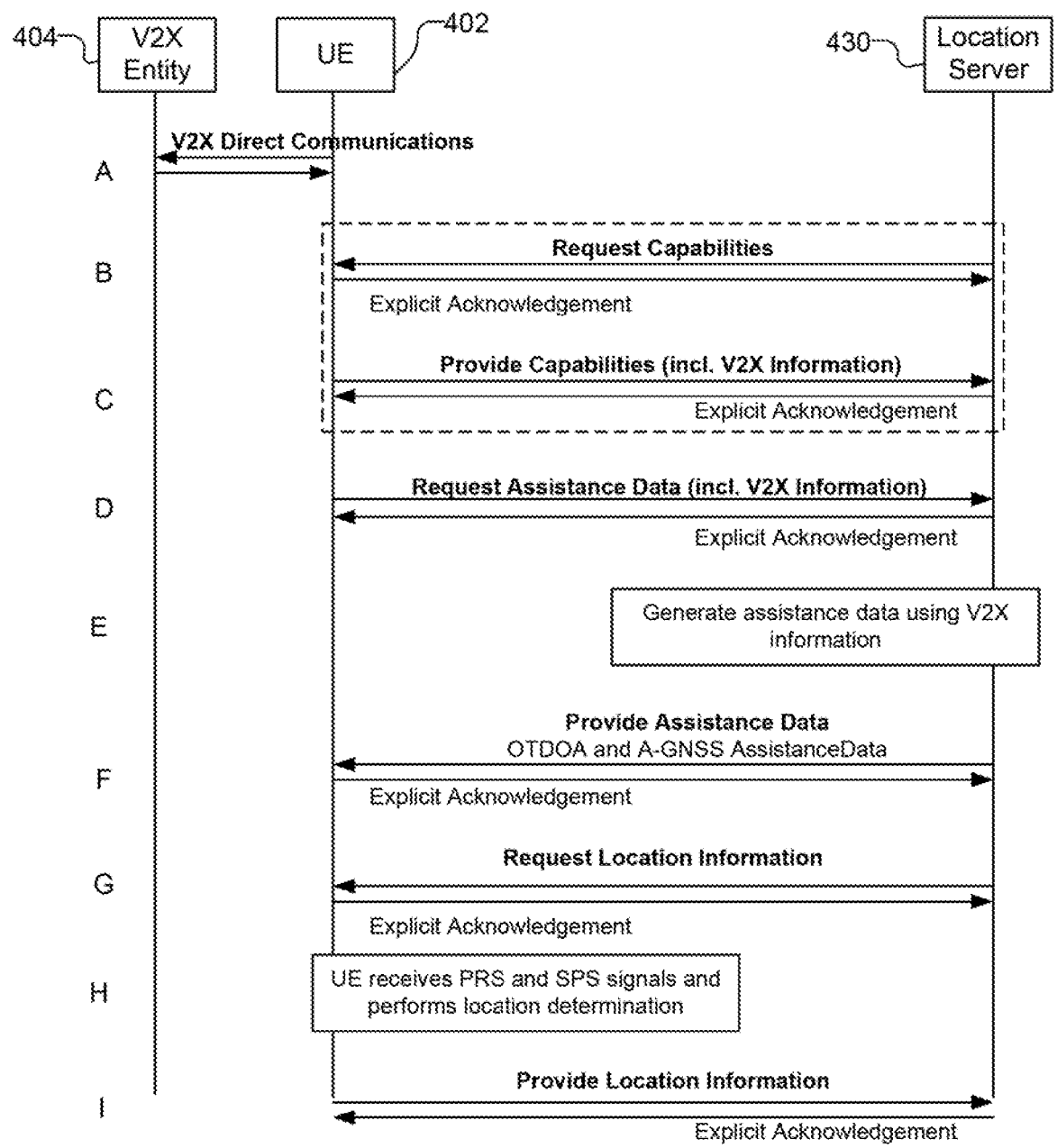
FIG. 4 illustrates an example of a call flow for a location determination session with a user equipment, a location server, and a V2X entity.

FIG. 4, by way of example, illustrates an example of a call flow for a location determination session with UE 402, a location server 430, and a V2X entity 404, which may be, e.g., a V2I entity such as the road side unit 304 shown in FIG. 3. It should be understood that the UE 402 may be in communication with one or more V2X entities prior to the initiation of a location determination session. Alternatively, the location determination session may be initiated, and in response, the UE 402 may scan for nearby V2X capable entities, which may be implemented, for example, using a search beacon where V2X entities would respond with their identity or identity and location upon seeing the beacon.

As illustrated, in step A, the UE 402 and the V2X entity 404 exchange V2X direct communications. The V2X direct communications with the V2X entity 404 provides V2X information to the UE 402, such as the identity of the V2X entity 404, which may be, e.g., an International Mobile station Equipment Identities (IMEI), or any identifier that uniquely identifies the V2X entity. It should be understood that the UE 402 may be in direct communications with more than one V2X entity and may obtain V2X information from more than one V2X entity.

In step B, the location server 430 may send a Request-Capabilities message to the UE 402 to indicate the type of capabilities needed, and in response an explicit acknowledgement may be provide by the UE 402 to the location server 430. In step C, the UE 402 may respond with a ProvideCapabilities message to the location server 430 and an explicit acknowledgment may be returned by the location server 430. The ProvideCapabilities message may include, e.g., information elements such as OTDOA mode supported by the UE 402. Additionally, the ProvideCapabilities message may include the V2X information, obtained in step A. Steps B and C may be optional.

In step D, the UE 402 may request positioning assistance data, which is explicitly acknowledged by the UE 402. The request for assistance data may include the V2X information obtained in step A, e.g., if the V2X information was not provided in step C. The request for assistance data may further include, e.g., an identifier of the serving base station or other information from which the approximate location of the UE 402 may be determined. The request for assistance data may additionally include a request for A-GNSS assistance data, if an A-GNSS/OTDOA Hybrid mode for location determination is to be used. In step E, the location server 430 generates assistance data using the V2X information. For example, as discussed above, the location server 430 may use the V2X information to contact a V2X application server to obtain the location of the V2X entity 404. Using the location of the V2X entity 404, the location server 430 may select neighbor base stations, and predict the expected RSTD values and uncertainty and a PRS search window.

In step F, the location server 430 sends to the UE 402 a Provide Assistance Data message that includes the OTDOA assistance data generated using the V2X information, which is explicitly acknowledged by the UE 402. For example, the assistance data may include a base station almanac that includes the position information and identification of neighbor base stations and may include the serving base station along with their PRS configurations, and a PRS search window. The Provide Assistance Data message may also include A-GNSS assistance data if desired. Multiple Provide Assistance Data messages may be required for delivery of the assistance data. It should be understood that the use of an A-GNSS/OTDOA hybrid mode is provided by way of example. If location determination is to be performed without A-GNSS, there would be no need for the A-GNSS assistance data in the Provide Assistance Data in step F, and only the OTDOA assistance data may be provided to the UE 402 in the Provide Assistance Data by the location server 430.

In step G, the location server 430 sends a Request Location Information message to the UE 402, e.g., requesting the location of the UE402, which is explicitly acknowledged by the UE 402. As illustrated in step H, the UE 402 receives PRS signals from the neighbor base stations using the PRS configurations and information from the assistance data, such as the identification of neighbor base stations, provided in step F. In some implementations, the UE 402 may further receive PRS signals from the V2X entity 404 (or one or more different V2X entities). The UE 402 may additionally acquire SPS signals using the A-GNSS assistance data provided in step F. The UE 402 may perform the location determination based on the received PRS signals and SPS signals in step H. In step I, the UE 402 may return the determined location to the location server 430.

If desired, the location server 430 may determine the location of the UE 402. In such an embodiment, the location server 430 may determine the mode to be used for positioning, e.g., the location server 430 may choose the A-GNSS/OTDOA Hybrid, and provide the OTDOA assistance data, including a base station almanac, and A-GNSS assistance data in step F without the UE 402 specifically requesting A-GNSS assistance data in step D. Additionally, in step H, the UE 402 may receive PRS signals and SPS signals, and may perform RSTD measurements using the PRS signals. The RSTD measurements and SPS measurements from UE 402 may be provided to the location server 430 as location information in step I, and the location server 430 may determine the location of the UE 402. The RSTD measurement information provided to the location server 430 may include, e.g., the identity of the reference base station and neighbor base stations, as well as the associated RSTD measurement values and quality.

Figure 5:
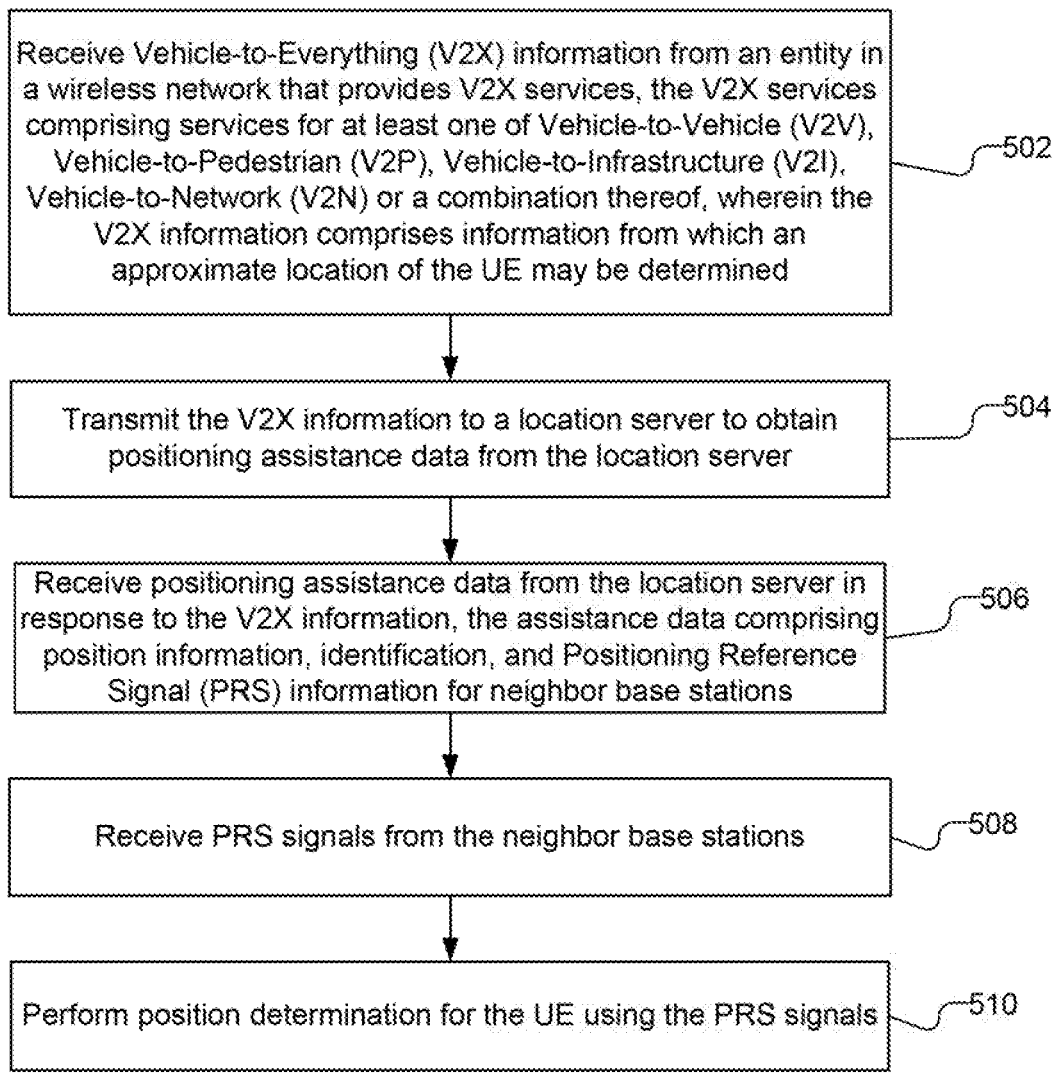
FIG. 5 is a flow chart illustrating a method of performing location determination by a user equipment.

FIG. 5 is a flow chart illustrating a method of performing location determination by a user equipment (UE). As illustrated, the UE receives Vehicle-to-Everything (V2X) information from an entity in a wireless network that provides V2X services (502). The V2X services comprise services for at least one of Vehicle-to-Vehicle (V2V), Vehicle-to-Pedestrian (V2P), Vehicle-to-Infrastructure (V2I), Vehicle-to-Network (V2N), or a combination thereof. The V2X information comprises information from which an approximate location of the UE may be determined. For example, the V2X information may be an identity of the entity in the wireless network that provides V2X services. The entity in the wireless network that provides V2X services, by way of example, may be a stationary entity, such as a road side unit, or alternatively may be a non-stationary entity, such as a vehicle or a UE carried by a pedestrian. It should be understood that the UE may receive V2X information from more than one V2X entity.

The V2X information is transmitted to a location server to obtain positioning assistance data from the location server (504). By way of example, the positioning assistance data from the location server may be for location determination of the UE using, e.g., time of arrival (TOA), time difference of arrival (TDOA) or observed time difference of arrival (OTDOA) positioning solutions. The V2X information may be transmitted to the location server in a Provide Capability Message. Additionally or alternatively, the V2X information may be transmitted to the location server in a Request Assistance Data. The V2X information may be transmitted to the location server in addition to an identity of a serving base station. Alternatively, the V2X information may be transmitted to the location server instead of transmitting an identity of a serving base station.

The UE receives positioning assistance data from the location server in response to the V2X information, the assistance data comprising position information, identification, and Positioning Reference Signal (PRS) information for neighbor base stations (506). For example, the received positioning assistance data may include observed time difference of arrival (OTDOA) assistance data.

The UE receives PRS signals from the neighbor base stations (508) and performs position determination for the UE using the PRS signals (510). In one implementation, the UE receives PRS signals from the entity or a different entity in the wireless network that provides V2X services, wherein the position determination for the UE may use the PRS signals from the neighbor base stations and the entity or the different entity in the wireless network that provides V2X services. The UE may perform the position determination, for example, by determining ranging information to the neighbor base stations (and the entity in the wireless network that provides V2X services if used) using the PRS signals. The ranging information and position information for the base stations (and the entity in the wireless network that provides V2X services if used) may be used to determine the position of the user equipment. The ranging information may be, e.g., time of arrival or time difference of arrival measurements. The UE may determine the location of the UE using the ranging information or may provide the ranging information to a location server, which may determine the location of the UE.

Figure 6:
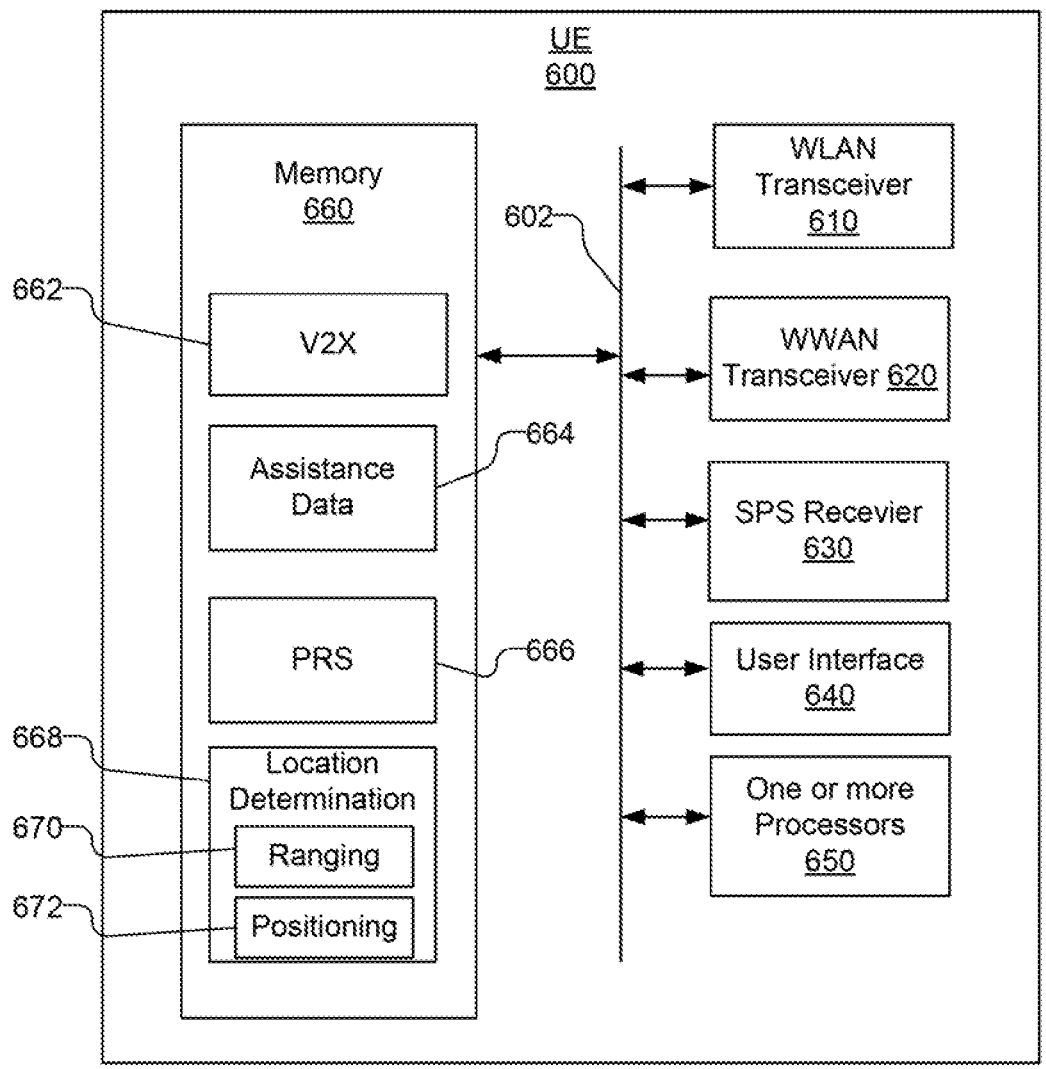
FIG. 6 is a diagram illustrating an example of a hardware implementation of a user equipment capable of V2X communications and performing location determination using PRS signals.

FIG. 6 is a diagram illustrating an example of a hardware implementation of a UE 600 capable of V2X communications with V2X entities and performing location determination using PRS signals. The UE 600 includes a Wireless Wide Area Network (WWAN) transceiver 620, including a transmitter and receiver, such as a cellular transceiver, configured to wirelessly communicate with a location server in a wireless network and to receive PRS signals from base stations in the wireless network. The WWAN transceiver 620 may also be configured to wirelessly communicate directly with V2X entities and to receive V2X information, such as the identity of the V2X entities, e.g., using wireless communications under IEEE 802.11p on the ITS band of 5.9 GHz or other appropriate short range wireless communications. The UE may further include a Wireless Local Area Network (WLAN) transceiver 610, including a transmitter and receiver, which may also be used to wirelessly communicate directly with other entities, and in some embodiments with V2X entities. The UE 600 may further include an SPS receiver 630 with which. SPS signals from SPS satellites may be received. The UE 600 may include additional features, such as user interface 640 that may include e.g., a display, a keypad or other input device, such as virtual keypad on the display, through which the user may interface with the UE 600.

The UE 600 further includes one or more processors 650 and memory 660, which may be coupled together with bus 602. The one or more processors 650 and other components of the UE 600 may similarly be coupled together with bus 602, a separate bus, or may be directly connected together or coupled using a combination of the foregoing. The memory 660 may contain executable code or software instructions that when executed by the one or more processors 650 cause the one or more processors 650 to operate as a special purpose computer programmed to perform the techniques disclosed herein. As illustrated in FIG. 6, the memory 660 may include one or more components or modules that may be implemented by the one or more processors 650 to perform the methodologies described herein. While the components or modules are illustrated as software in memory 660 that is executable by the one or more processors 650, it should be understood that the components or modules may be dedicated hardware either in the one or more processors 650 or off the processors.

The memory 660 may include a V2X unit 662 that when implemented by the one or more processors 650 configures the one or more processors 650 cause the WWAN transceiver 620 to directly communicate with V2X entities. The V2X unit 662 configures the one or more processors 650 to receive V2X information from the V2X entities via the WWAN transceiver 620. The memory 660 may further include an assistance data unit 664 that when implemented by the one or more processors 650 configures the one or more processors 650 to request assistance data from a location server via the WWAN transceiver 620. The assistance data unit 664 further configures the one or more processors 650 to provide V2X information to the location server, e.g., in a provide capabilities message or an assistance data request message. The assistance data unit 664 further configures the one or more processors 650 to process the assistance data, which may include position information, identification, and Positioning Reference Signal (PRS) information for neighbor base stations, that is returned from the location server in response to the V2X information. The memory 660 may include a PRS unit 666 that when implemented by the one or more processors 650 enables the one or more processors 650 to receive PRS signals from the neighbor base stations via the WWAN transceiver 620, and may enable the one or more processors 650 to receive PRS signals from one or more V2X entities via the WWAN transceiver 620. The memory 660 may include a location determination unit 668 that when implemented by the one or more processors 650 configures the one or more processors 650 to perform position determination using the received PRS signals. For example, the location determination unit 668 may include a ranging unit 670 that when implemented by the one or more processors 650 configures the one or more processors 650 to determine ranging information, such as the time of arrival or time difference of arrival using the PRS signals. The location determination unit 668 may also include a positioning unit 672 that when implemented by the one or more processors 650 configures the one or more processors 650 to use the ranging values along with the positions of the base stations from the base station almanac to determine the position of the UE 600, e.g., using multi-lateration. Alternatively, the positioning unit 672 may configure the one or more processors 650 to cause the WWAN transceiver 620 to send the ranging values for a number of base stations to a location server to determine the position of the UE 600.

The methodologies described herein may be implemented by various means depending upon the application. For example, these methodologies may be implemented in hardware, firmware, software, or any combination thereof. For a hardware implementation, the one or more processors 650 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 600 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 660) and executed by one or more processors 650, causing the one or more processors 650 to operate as a special purpose computer programmed to perform the techniques disclosed herein. Memory may be implemented within the one or processors 650 or external to the one or more processors 650. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 600 may be stored as one or more instructions or code on a non-transitory computer-readable storage medium such as memory 660. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 600 may be provided as signals on transmission media included in a communication apparatus. For example, a communication apparatus comprising part or all of UE 600 may include a transceiver having signals indicative of instructions and data. The instructions and data are stored on non-transitory computer readable media, e.g., memory 660, and are configured to cause the one or more processors 650 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment, such as UE 600, may include a means for receiving Vehicle-to-Everything (V2X) information from an entity in a wireless network that provides V2X services, the V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X information comprises information from which an approximate location of the UE may be determined, which may be, e.g., the WWAN transceiver 620 and one or more processors 650 with dedicated hardware or implementing executable code or software instructions in memory 660 such as the V2X unit 662. A means for transmitting the V2X information to a location server to obtain positioning assistance data from the location server may be, e.g., the WWAN transceiver 620 and one or more processors 650 with dedicated hardware or implementing executable code or software instructions in memory 660 such as the assistance data unit 664. A means for receiving positioning assistance data from the location server in response to the V2X information, the assistance data comprising position information, identification, and Positioning Reference Signal (PRS) information for neighbor base stations may be, e.g., e.g., the WWAN transceiver 620 and one or more processors 650 with dedicated hardware or implementing executable code or software instructions in memory 660 such as the assistance data unit 664. A means for receiving PRS signals from the neighbor base stations may include, e.g., the WWAN transceiver 620 and one or more processors 650 with dedicated hardware or implementing executable code or software instructions in memory 660 such as the PRS unit 664. A means for performing position determination for the UE using the PRS signals may be, e.g., the one or more processors 650 with dedicated hardware or implementing executable code or software instructions in memory 660 such as the location determination unit 668 including the ranging unit 670 and the positioning unit 672.

Additionally, the UE 600 may further include a means for receiving PRS signals from the entity in the wireless network that provides V2X services, wherein performing OTDOA positioning for the UE using the PRS signals comprises using the PRS signals from the neighbor base stations and the entity in the wireless network that provides V2X services, which may be, e.g., the WWAN transceiver 620 and one or more processors 650 with dedicated hardware or implementing executable code or software instructions in memory 660 such as the PRS unit 664.

Figure 7:
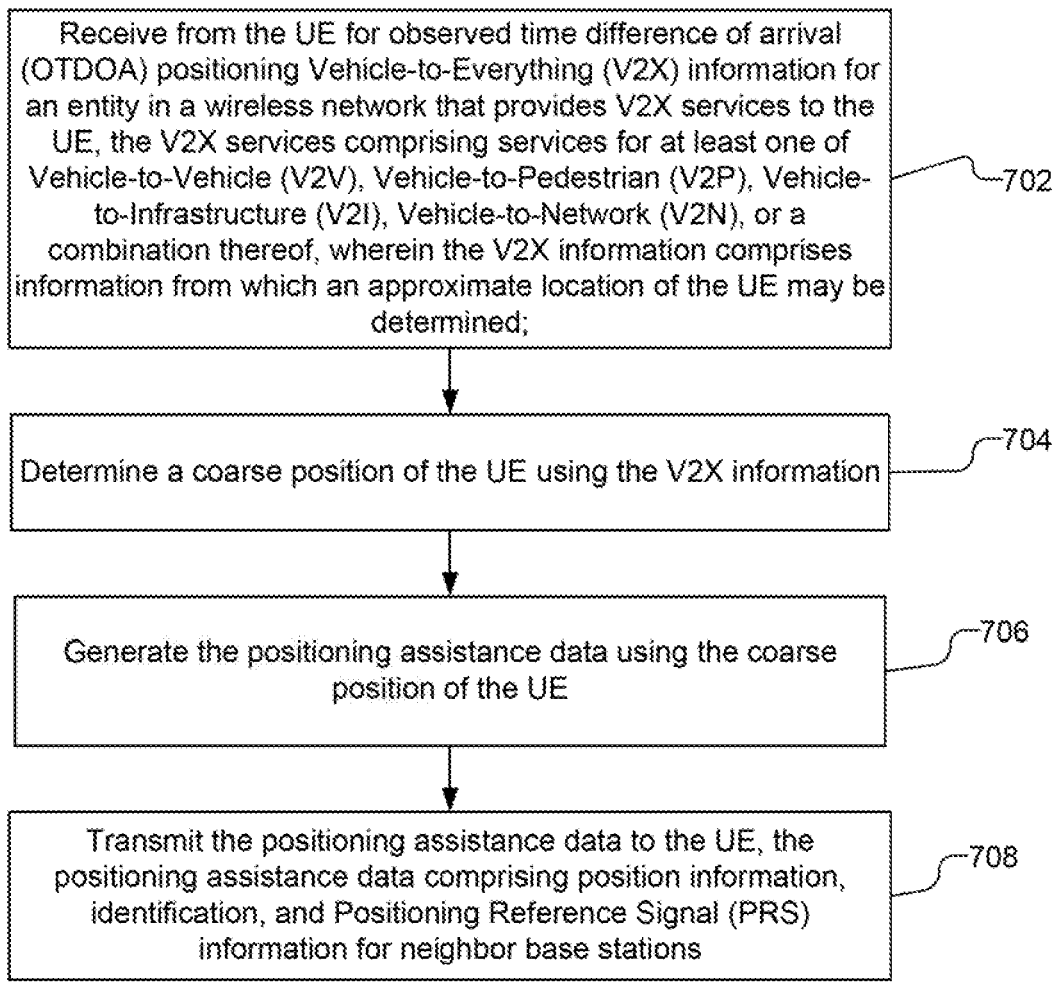
FIG. 7 is a flow chart illustrating a method of performing location determination for a user equipment with a location server.

FIG. 7 is a flow chart illustrating a method of performing location determination for a user equipment (UE) with a location server. As illustrated, a location server receives Vehicle-to-Everything (V2X) information from the UE to obtain positioning assistance data from the location server (702). By way of example, the positioning assistance data from the location server may be for location determination of the UE using, e.g., time of arrival (TOA), time difference of arrival (TDOA) or observed time difference of arrival (OTDOA) positioning solutions. The V2X information is for an entity in a wireless network that provides V2X services to the UE. The V2X services for example, may include at least one of Vehicle-to-Vehicle (V2V), Vehicle-to-Pedestrian (V2P), Vehicle-to-Infrastructure (V2I), Vehicle-to-Network (V2N), or a combination thereof. The V2X information may include information from which an approximate location of the UE may be determined. For example, the V2X information may be an identity of the entity in the wireless network that provides V2X services. The entity in the wireless network that provides V2X services, by way of example, may be a stationary entity, such as a road side unit, or alternatively may be a non-stationary entity, such as a vehicle or a UE carried by a pedestrian. The V2X information may be received in a Provide Capability Message. Additionally or alternatively, the V2X information may be received in a Request Assistance Data.

A coarse position of the UE is determined using the V2X information (704). For example, the coarse position of the UE may be determined using the V2X information by obtaining a static location of the entity in the wireless network that provides V2X services from a V2X application server, where the coarse position is estimated using the static location of the entity.

The positioning assistance data is generated using the coarse position of the UE (706). For example, neighbor base stations may be selected using the coarse position and the position information, identification, and Positioning Reference Signal (PRS) information for neighbor base stations may be obtained. In one implementation, a serving base station identity may be received from the UE in addition to the V2X information to obtain positioning assistance data, wherein the positioning assistance data is generated further using the serving base station identity.

The positioning assistance data is transmitted to the UE, the positioning assistance data comprising position information, identification, and Positioning Reference Signal (PRS) information for neighbor base stations (708).

Figure 8:
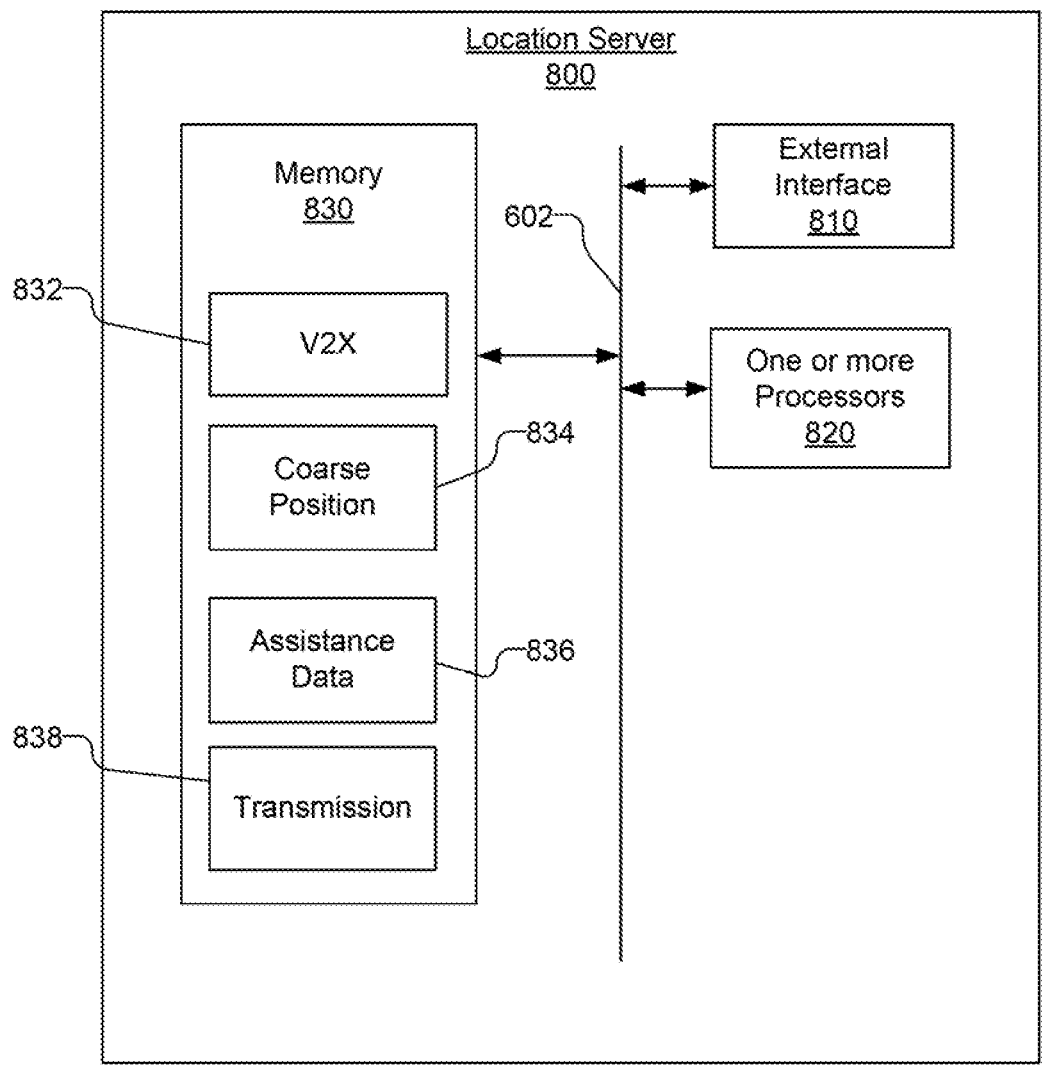
FIG. 8 is a diagram illustrating an example of a hardware implementation of a location server capable of generating positioning assistance data for a user equipment using V2X information.

FIG. 8 is a diagram illustrating an example of a hardware implementation of a location server 800 capable of generating positioning assistance data for a UE using V2X information. The location server 800 includes, e.g., hardware components such as an external interface 810, which may be a wired or wireless interface capable of connecting to UE directly or through one or more intermediary networks and/or one or more network entities. The location server 800 includes one or more processors 820 and memory 830, which may be coupled together with bus 802. The memory 830 may contain executable code or software instructions that when executed by the one or more processors 820 cause the one or more processors to operate as a special purpose computer programmed to perform the techniques disclosed herein. As illustrated in FIG. 8, the memory 830 may include one or more components or modules that may be implanted by the one or more processors 820 to perform the methodologies as described herein. While the components or modules are illustrated as software in memory 830 that is executable by the one or more processors 820, it should be understood that the components or modules may be dedicated hardware either in the one or more processors 820 or off the processors.

The memory 830 may include a V2X unit 832 that when implemented by the one or more processors 820 enables the one or more processors 820 to receive Vehicle-to-Everything (V2X) information from the UE to obtain positioning assistance data via the external interface 810. The V2X information may be received, e.g., in a provide capabilities message or an assistance data request message. The memory 830 may include a coarse position unit 834 that when implemented by the one or more processors 820 configures the one or more processors 820 to determine a coarse position of the UE using the V2X information. For example, the coarse position unit 834 may configure the one or more processors 820 to provide the V2X information to a remote V2X Application Server, via the external interface 810, to obtain a location of the V2X entity associated with the V2X information, and to use the location of the V2X entity as the coarse position of the UE. The memory 830 may include an assistance data unit 836 that when implemented by the one or more processors 820 configures the one or more processors 820 to generate the positioning assistance data using the coarse position of the UE. For example, the one or more processors 820 may be configured to select neighbor base stations using the coarse position and to obtain the position information, identification, and Positioning Reference Signal (PRS) information for neighbor base stations. The one or more processors 820 further may be configured to predict the RSTD value that the UE is expected to measure as well as the RSTD uncertainty and to generate a PRS search window. The memory 830 may include an transmission unit 838 that when implemented by the one or more processors 820 configures the one or more processors 820 to transmit the positioning assistance data to the UE via the external interface 810.

The methodologies described herein may be implemented by various means depending upon the application. For example, these methodologies may be implemented in hardware, firmware, software, or any combination thereof. For a hardware implementation, the one or more processors 820 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of location server 800 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 830) and executed by one or more processors 820, causing the one or more processors 820 to operate as a special purpose computer programmed to perform the techniques disclosed herein. Memory may be implemented within the one or processors 820 or external to the one or more processors 820. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by location server 800 may be stored as one or more instructions or code on a non-transitory computer-readable storage medium such as memory 830. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for location server 800 may be provided as signals on transmission media included in a communication apparatus. For example, a communication apparatus comprising part or all of location server 800 may include a transceiver having signals indicative of instructions and data. The instructions and data are stored on non-transitory computer readable media, e.g., memory 830, and are configured to cause the one or more processors 820 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a location server, such as location server 800, may include a means for receiving Vehicle-to-Everything (V2X) information from the UE to obtain positioning assistance data, the V2X information is for an entity in a wireless network that provides V2X services to the UE, the V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X information comprises information from which an approximate location of the UE may be determined, which may be, e.g., the external interface 810 and one or more processors 820 with dedicated hardware or implementing executable code or software instructions in memory 830 such as the V2X unit 832. A means for determining a coarse position of the UE using the V2X information may be, e.g., the one or more processors 820 with dedicated hardware or implementing executable code or software instructions in memory 830 such as the coarse position unit 834 and may further include the external interface 810 to contact a remote V2X Application Server. A means for generating the positioning assistance data using the coarse position of the UE may be, e.g., the one or more processors 820 with dedicated hardware or implementing executable code or software instructions in memory 830 such as the assistance data 836. A means for transmitting the positioning assistance data to the UE, the positioning assistance data comprising position information, identification, and Positioning Reference Signal (PRS) information for neighbor base stations may be, e.g., external interface 810 and the one or more processors 820 with dedicated hardware or implementing executable code or software instructions in memory 830 such as the transmission unit 838.

In one implementation, the location server may include a means for obtaining a static location of the entity in the wireless network that provides V2X services from a V2X application server, which may be, e.g., the external interface 810 and one or more processors 820 with dedicated hardware or implementing executable code or software instructions in memory 830 such as the coarse position unit 834 and a means for estimating the coarse position using the static location of the entity, which may be, e.g., the one or more processors 820 with dedicated hardware or implementing executable code or software instructions in memory 830 such as the coarse position unit 834. In one implementation, the location server may include a means for receiving a serving base station identity from the UE for the OTDOA positioning, wherein generating the positioning assistance data further uses the serving base station identity, which may be, e.g., the external interface 810 and one or more processors 820 with dedicated hardware or implementing executable code or software instructions in memory 830 such as the assistance data unit 836.

Figure 9:
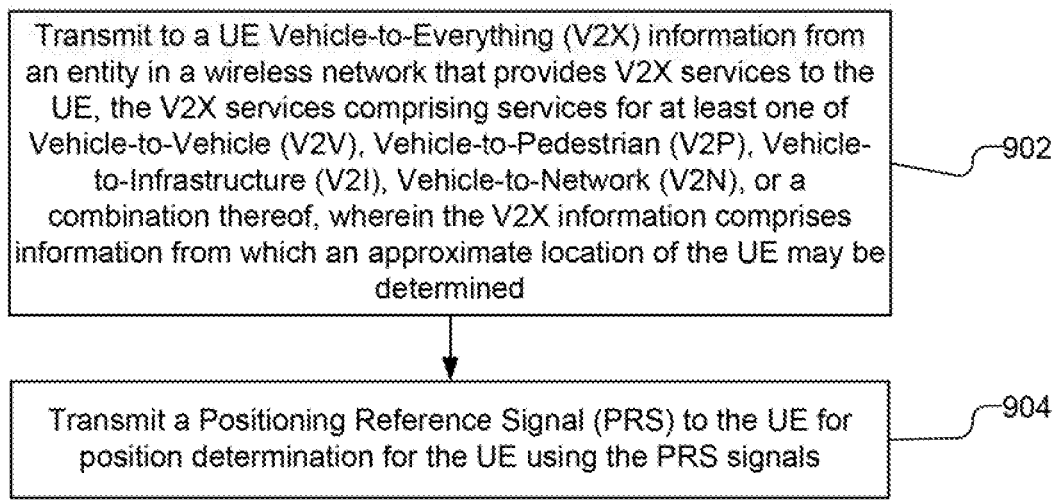
FIG. 9 is a flow chart illustrating a method of performing location determination of a user equipment with an entity in a wireless network that provides V2X services to the UE.

FIG. 9 is a flow chart illustrating a method of performing location determination of a user equipment (UE) with an entity in a wireless network that provides V2X services to the UE. As illustrated, the entity that is in a wireless network that provides V2X services to the UE transmits Vehicle-to-Everything (V2X) information to the UE (902). The V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof. The V2X information comprises information from which an approximate location of the UE may be determined. For example, the V2X information may be an identity of the entity in the wireless network that provides V2X services. The entity in the wireless network that provides V2X services, by way of example, may be a stationary entity, such as a road side unit, or alternatively may be a non-stationary entity, such as a vehicle or a UE carried by a pedestrian. The entity further transmits a Positioning Reference Signal (PRS) to the UE for position determination for the UE using the PRS signals (904). The PRS signal may be transmitted to the UE via short range wireless signals. A stationary entity, such as a road side unit may transmit PRS signals all the time. Non-stationary entities, such as a vehicle, may determine when it is in a stationary condition and will continue to be in a stationary condition, e.g., for a predetermined number of seconds, and may start transmitting PRS signals during the stationary period along with the time information. Other non-stationary entities, such as a pedestrian, that are slow moving may transmit PRS signals and share information about their speed and trajectory.

Figure 10:
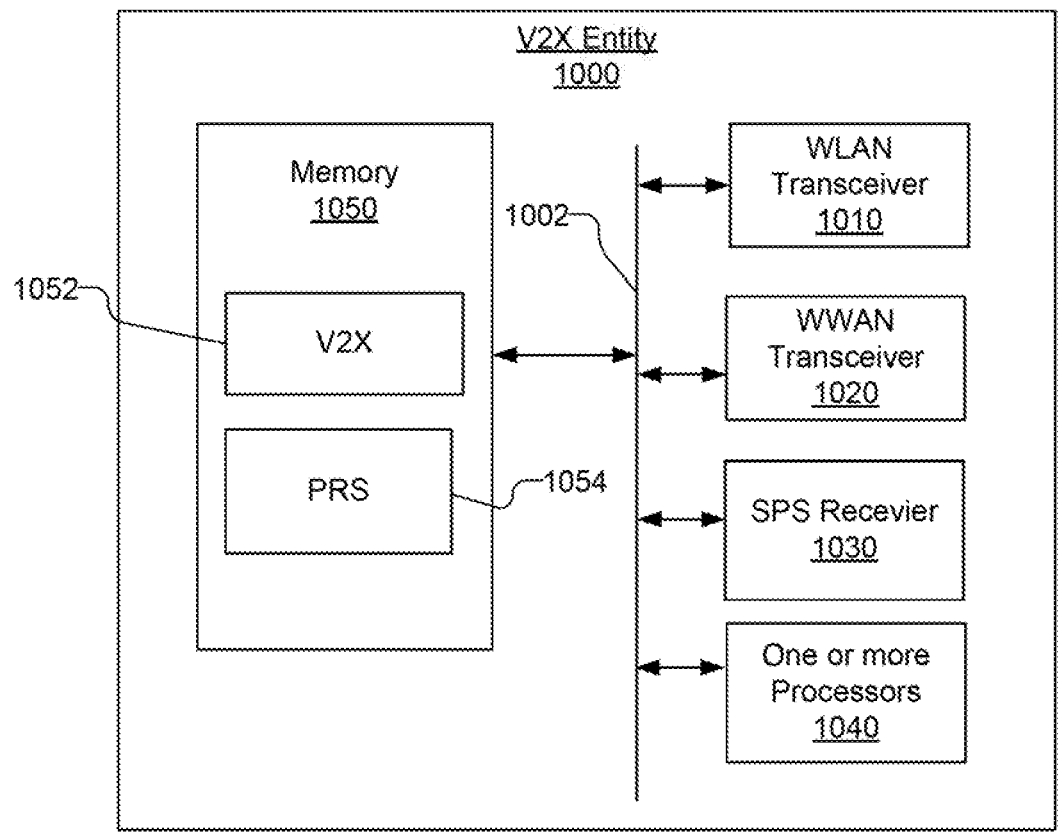
FIG. 10 is a diagram illustrating an example of a hardware implementation of a V2X entity capable of V2X communications with a user equipment and providing Positioning Reference Signal (PRS) signals to the user equipment for position determination.

FIG. 10 is a diagram illustrating an example of a hardware implementation of a V2X entity 1000 capable of V2X communications with a UE and providing PRS signals to the UE for position determination. By way of example, the V2X entity 1000 may be a stationary entity, such as a road side unit, but alternatively may be a non-stationary entity, such as a vehicle or a UE carried by a pedestrian. The V2X entity 1000 includes a Wireless Wide Area Network (WWAN) transceiver 1020, including a transmitter and receiver, such as a cellular transceiver, configured to wirelessly communicate with a wireless network and to wirelessly communicate directly with and transmit V2X information to UEs, e.g., using wireless communications under IEEE 802.11p on the ITS band of 5.9 GHz or other appropriate short range wireless communications. The WWAN transceiver 1020 may be configured to wirelessly communicate with a location server in the wireless network and to receive synchronizing signals from the network to generate PRS signals from base stations in the wireless network. In other implementation, a separate V2X entity that supports both legacy PRS and as well as V2X may be used to synchronize signals from the WWAN network. The V2X entity 1000 may further include a Wireless Local Area Network (WLAN) transceiver 1010, including a transmitter and receiver, which may also be used to wirelessly communicate directly with other entities, and in some embodiments with UEs. The V2X entity 1000 may further include an SPS receiver 1030 with which SPS signals from SPS satellites may be received to obtain timing information to generate PRS signals.

The V2X entity 1000 further includes one or more processors 1040 and memory 1050, which may be coupled together with bus 1002. The one or more processors 1040 and other components of the V2X entity 1000 may similarly be coupled together with bus 1002, a separate bus, or may be directly connected together or coupled using a combination of the foregoing. The memory 1050 may contain executable code or software instructions that when executed by the one or more processors 1040 cause the one or more processors 1040 to operate as a special purpose computer programmed to perform the techniques disclosed herein. As illustrated in FIG. 10, the memory 1050 may include one or more components or modules that may be implemented by the one or more processors 1040 to perform the methodologies described herein. While the components or modules are illustrated as software in memory 1050 that is executable by the one or more processors 1040, it should be understood that the components or modules may be dedicated hardware either in the one or more processors 1040 or off the processors.

The memory 1050 may include a V2X unit 1052 that when implemented by the one or more processors 1040 configures the one or more processors 1040 to communicate with UEs, e.g., directly through WWAN transceiver 1020 or via a network through WWAN transceiver 1020. The V2X unit 1052 configures the one or more processors 1040 to transmit V2X information to the UE. The memory 1050 may include a PRS unit 1056 that when implemented by the one or more processors 1040 configures the one or more processors 1040 to generate PRS signals and to transmit PRS signals to the UE via the WWAN transceiver 1020.

The methodologies described herein may be implemented by various means depending upon the application. For example, these methodologies may be implemented in hardware, firmware, software, or any combination thereof. For a hardware implementation, the one or more processors 1040 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of V2X entity 1000 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 1050) and executed by one or more processors 1040, causing the one or more processors 1040 to operate as a special purpose computer programmed to perform the techniques disclosed herein. Memory may be implemented within the one or processors 1040 or external to the one or more processors 1040. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by V2X entity 1000 may be stored as one or more instructions or code on a non-transitory computer-readable storage medium such as memory 1050. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for V2X entity 1000 may be provided as signals on transmission media included in a communication apparatus. For example, a communication apparatus comprising part or all of V2X entity 1000 may include a transceiver having signals indicative of instructions and data. The instructions and data are stored on non-transitory computer readable media, e.g., memory 1050, and are configured to cause the one or more processors 1040 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a V2X entity, may include a means for transmitting to a UE Vehicle-to-Everything (V2X) information from an entity in a wireless network that provides V2X services to the UE, the V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X information comprises information from which an approximate location of the UE may be determined, which may be, e.g., the WWAN transceiver 1020 and one or more processors 1040 with dedicated hardware or implementing executable code or software instructions in memory 1050 such as the V2X unit 1052. A means for transmitting a Positioning Reference Signal (PRS) from the entity to the UE for position determination for the UE using the PRS signals may be, e.g., the WWAN transceiver 1020 and one or more processors 1040 with dedicated hardware or implementing executable code or software instructions in memory 1050 such as the PRS unit 1052.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of performing location determination by a user equipment (UE), the method comprising:

receiving Vehicle-to-Everything (V2X) information from a V2X entity in a wireless network that provides V2X services, the V2X services comprising services for at least one of Vehicle-to-Vehicle (V2V), Vehicle-to-Pedestrian (V2P), Vehicle-to-Infrastructure (V2I), Vehicle-to-Network (V2N) or a combination thereof, wherein the V2X information comprises a location of the V2X entity, wherein the V2X entity is not a cellular base station or access point;

transmitting the location of the V2X entity to a location server to obtain positioning assistance data from the location server;

receiving positioning assistance data from the location server in response to the location of the V2X entity, the positioning assistance data comprising position information, identification, and Positioning Reference Signal (PRS) information for neighbor cellular base stations and the V2X entity or a different V2X entity, the PRS information comprising at least one of PRS bandwidth, a PRS Configuration Index, a number of PRS downlink (DL) frames, or muting information;

receiving PRS signals from the neighbor cellular base stations and PRS signals from the V2X entity or the different V2X entity using the positioning assistance data; and performing position determination for the UE using the PRS signals from the neighbor cellular base stations and the PRS signals from the V2X entity or the different V2X entity;, wherein the location of the V2X entity is transmitted to the location server but an identity of a serving base station is not transmitted to the location server.

2. The method of claim 1, wherein the V2X information further comprises an identity of the V2X entity.

3. The method of claim 1, wherein the V2X entity is a road side unit.

4. The method of claim 1, wherein the location of the V2X entity is transmitted to the location server in a Provide Capability Message.

5. The method of claim 1, wherein the positioning assistance data from the location server further comprises expected Received Signal Time Difference (RSTD) and expected RSTD uncertainty for the V2X entity or the different V2X entity.

6. A user equipment (UE) that performs location determination, the UE comprising:

at least one wireless transceiver configured to wirelessly communicate with Vehicle-to-Everything (V2X) entities in a first wireless network that provides V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X entity is not a cellular base station or access point, and configured to wirelessly communicate with cellular base stations in a second wireless network; and at least one processor coupled to the at least one wireless transceiver and configured to receive with the at least one wireless transceiver V2X information from V2X entity in the wireless network that provides V2X services, wherein the V2X information comprises a location of the V2X entity, transmit with the at least one wireless transceiver the location of the V2X entity to a location server to obtain positioning assistance data from the location server, receive with the at least one wireless transceiver positioning assistance data from the location server in response to the location of the V2X entity, the positioning assistance data comprising position information, identification, and Positioning Reference Signal (PRS) information for neighbor cellular base stations and the V2X entity or a different V2X entity, the PRS information comprising at least one of PRS bandwidth, a PRS Configuration Index, a number of PRS downlink (DL) frames, or muting information, receive PRS signals from the neighbor cellular base stations and PRS signals from the V2X entity or a different V2X entity, using the positioning assistance data, and perform position determination for the UE using the PRS signals from the neighbor cellular base stations and the PRS signals from the V2X entity or the different V2X entity, wherein the location of the V2X entity is transmitted to the location server but an identity of a serving base station is not transmitted to the location server.

7. The UE of claim 6, wherein the V2X information further comprises an identity of the V2X entity.

8. The UE of claim 6, wherein the V2X entity is a road side unit.

9. The UE of claim 6, wherein the location of the V2X entity is transmitted to the location server in a Provide Capability Message.

10. A method of performing location determination for a user equipment (UE), the method comprising:

receiving Vehicle-to-Everything (V2X) information from the UE to obtain positioning assistance data, the V2X information is from a V2X entity in a wireless network that provides V2X services to the UE, the V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X information comprises a location of the V2X entity, wherein the V2X entity is not a cellular base station or access point;

determining a coarse position of the UE using the location of the V2X entity;

generating the positioning assistance data using the coarse position of the UE; and transmitting the positioning assistance data to the UE, the positioning assistance data comprising position information, identification, and Positioning Reference Signal (PRS) information for neighbor cellular base stations and identification of a V2X entity in the wireless network that provides V2X services that transmits PRS signals and PRS information for PRS signals transmitted by the V2X entity that transmits PRS signals, the PRS information comprising at least one of PRS bandwidth, a PRS Configuration Index, a number of PRS downlink (DL) frames, or muting information, wherein the location of the V2X entity is transmitted to the location server but an identity of a serving base station is not transmitted to the location server.

11. The method of claim 10, wherein the V2X information further comprises an identity of the V2X entity that provides V2X services.

12. The method of claim 10, wherein the V2X entity that provides V2X services is a road side unit.

13. The method of claim 10, wherein the location of the V2X entity is received from the UE in a Provide Capability Message.

14. A location server for location determination for a user equipment (UE), the location server comprising:
  an external interface configured to wirelessly communicate with the UE in a wireless network; and
  at least one processor coupled to the external interface and configured to receive with the external interface Vehicle-to-Everything (V2X) information from the UE to obtain positioning assistance data, the V2X information is from a V2X entity in a wireless network that provides V2X services to the UE, the V2X services comprising services for at least one of Vehicle-to-Vehicle (V2V), Vehicle-to-Pedestrian (V2P), Vehicle-to-Infrastructure (V2I), Vehicle-to-Network (V2N), or a combination thereof, wherein the V2X information comprises a location of the V2X entity, wherein the V2X entity is not a cellular base station or access point, determine a coarse position of the UE using the location of the V2X entity, generate the positioning assistance data using the coarse position of the UE, and transmit with the external interface the positioning assistance data to the UE, the positioning assistance data comprising position information, identification, and Positioning Reference Signal (PRS) information for neighbor cellular base stations and identification of a V2X entity in the wireless network that provides V2X services that transmits PRS signals and PRS information for PRS signals transmitted by the V2X entity that transmits PRS signals, the PRS information comprising at least one of PRS bandwidth, a PRS Configuration Index, a number of PRS downlink (DL) frames, or muting information, wherein the location of the V2X entity is transmitted to the location server but an identity of a serving base station is not transmitted to the location server.

15. The location server of claim 14, wherein the V2X information further comprises an identity of the V2X entity that provides V2X services.

16. The location server of claim 14, wherein the V2X entity that provides V2X services is a road side unit.

17. The location server of claim 14, wherein the location of the V2X entity is received from the UE in a Provide Capability Message.

* * * * *